(12) United States Patent
Shultz et al.

(10) Patent No.: US 7,991,743 B2
(45) Date of Patent: Aug. 2, 2011

(54) USER-DEFINABLE RUN-TIME GROUPING OF DATA RECORDS

(75) Inventors: John Thomas Shultz, Savage, MN (US); Jean Renee Grams, St. Paul, MN (US); Richard D. Patton, Hastings, MN (US); Gregory D. Lundgren, Lino Lakes, MN (US); Bradwin Eliot Preston, Apple Valley, MN (US); Leon Curtis Johnson, Inver Grove Heights, MN (US)

(73) Assignee: Lawson Software, Inc., St. Paul, MN (US)

( * ) Notice: Subject to any disclaimer, the term of this patent is extended or adjusted under 35 U.S.C. 154(b) by 404 days.

(21) Appl. No.: 11/869,569

(22) Filed: Oct. 9, 2007

(65) Prior Publication Data
US 2009/0094185 A1  Apr. 9, 2009

(51) Int. Cl.
*G06F 7/00* (2006.01)
*G06F 17/00* (2006.01)
(52) U.S. Cl. ........................................ 707/648; 707/947
(58) Field of Classification Search .................... 707/648
See application file for complete search history.

(56) References Cited

U.S. PATENT DOCUMENTS

| 5,787,411 | A | 7/1998 | Groff et al. |
| 6,208,985 | B1 | 3/2001 | Krehel |
| 2004/0088256 | A1* | 5/2004 | Klein et al. ..................... 705/40 |
| 2005/0015264 | A1* | 1/2005 | Mutchler ......................... 705/1 |
| 2006/0274703 | A1 | 12/2006 | Connelly |
| 2006/0293940 | A1* | 12/2006 | Tsyganskiy et al. .............. 705/8 |

OTHER PUBLICATIONS

"International Application Serial No. PCT/US2008/010194, International Search Report mailed Nov. 7, 2008", 6 pgs.
"International Application Serial No. PCT/US2008/010194, Written Opinion mailed Nov. 7, 2008", 5 pgs.

* cited by examiner

*Primary Examiner* — John R. Cottingham
*Assistant Examiner* — Nicholas E Allen
(74) *Attorney, Agent, or Firm* — Schwegman, Lundberg & Woessner, P.A.

(57) ABSTRACT

In some embodiments, a method includes receiving input that includes a criteria for filtering a set of records to define a subset of records within the set of records. The criteria is defined by an end design user. The method includes updating a business class group with the criteria, wherein the business class group is associated with an action for access the subset of records through the business class group. The method includes outputting a business application to be executed by at least one end user to access the subset of records through the business class group.

24 Claims, 15 Drawing Sheets

USER-DEFINABLE RUN-TIME GROUPING OF DATA RECORDS

COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The application relates generally to the field of software, more particularly, to grouping of records in a database.

BACKGROUND

Databases typically store data in different types data structures (such as records, tables, objects etc.). Various applications access the databases to locate certain groups of data structures.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given reference number in a Figure is associated with the number of the Figure. For example, a system 100 can be located in FIG. 1. However, reference numbers are the same for those elements that are the same across different Figures. In the drawings:

FIG. 10 illustrates a screen shot of a GUI that includes example logic for performing an action that references membership within a subset of records as defined by a business class group, according to some embodiments.

FIG. 12 illustrates a screen shot of a GUI that includes example logic for performing an action that determines a last date that a record was within a subset of records defined by a business class group, according to some embodiments.

DETAILED DESCRIPTION

Figure 1:
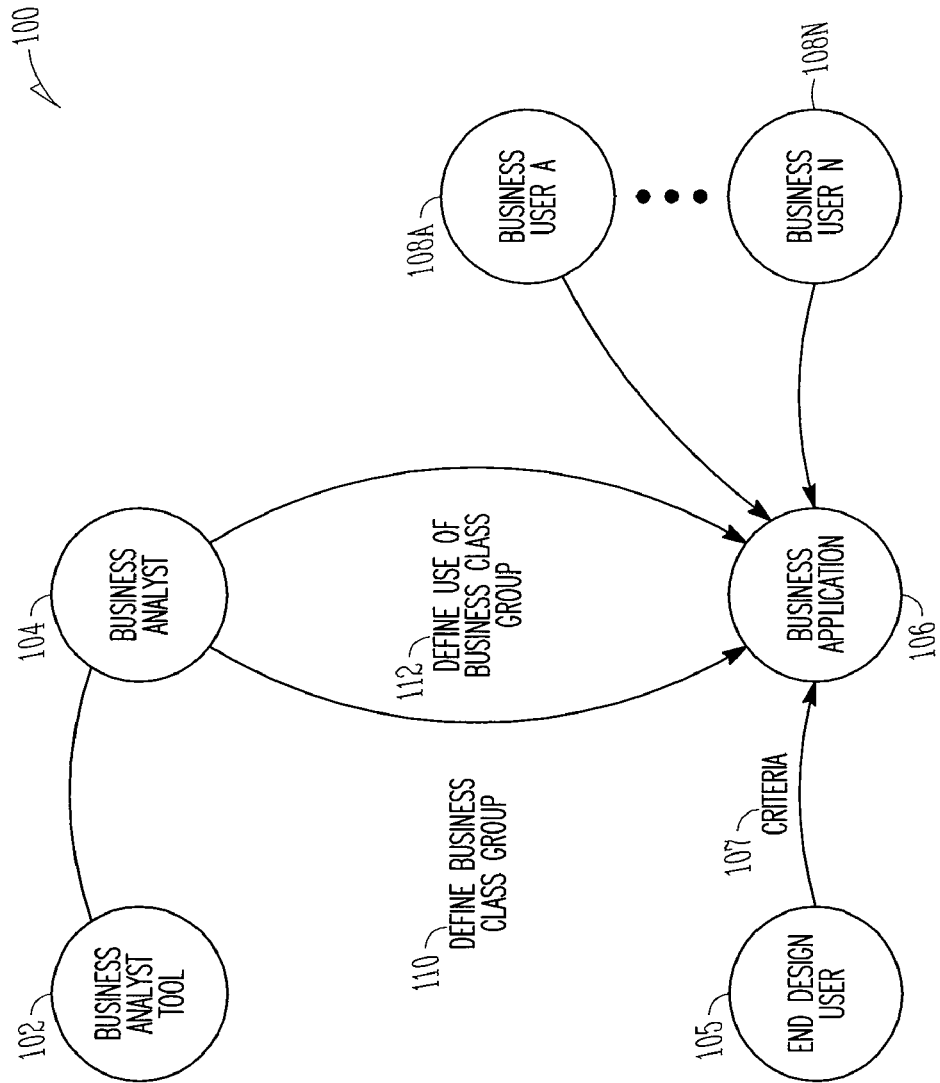
FIG. 1 is a system diagram for enabling user-defined criteria for grouping of records, according to some embodiments.

Methods, apparatus and systems for user-definable run-time grouping of data records are described. In the following description, numerous specific details are set forth. However, it is understood that embodiments of the invention may be practiced without these specific details. In other instances, well-known circuits, structures and techniques have not been shown in detail so as not to obscure the understanding of this description.

Business software applications typically apply business rules (certain conditions or criteria) to a pre-defined set or a set of pre-defined sets of records. However, users of such applications may need to apply business rules to records that are not included any pre-defined sets. Unfortunately, complex business applications are difficult to modify to accommodate this requirement. Another problem is the determination of when a record "entered" or "left" some particular set of records that is associated with a given business rule.

Example embodiments allow for end design users (such as business analysts) to define any type of business rule (condition or criteria). Furthermore, example embodiments may dynamically apply a business rule at run-time to determine which records are part of a group of records. While described in reference to business applications, example embodiments may be incorporated into any type of application to enable user-selectable run-time grouping of data records.

In some embodiments, a business application tool is provided to an end design user. Using the tool, the user may use a currently defined criteria for grouping a set of records (a subset of records). Alternatively or in addition, the user may define their own criteria for such grouping. Accordingly, the end design user may define logic that is based from user-defined record sets (rather than pre-defined record sets). Example criteria may include employees working a number of hours per week, per year, etc. Such criteria may be used to determine which employees for an organization are considered full-time. Another example criteria may include vendors having past dues beyond a given time period. Data records within a group defined by such criteria typically can change over time. Accordingly, as further described below, example embodiments allow for run-time grouping based on such criteria.

Some embodiments comprise a new field type that contains the criteria (condition) that is checked at run-time to determine which records are a part of a subset (group) among a set of records. This new field type may be referenced by any other logic to dynamically determine this subset of records. For example, the field type may be used to define a variable in a class definition. The class definition may also comprise one or more methods to determine and access this subset of records at run-time. In contrast to example embodiments, conventional techniques for determining membership in a subset of records were static. In particular, each time a record was changed, a separate record was stored elsewhere that indicated its membership in group(s). Thus, example embodiments do not require the updating of a "shadow" file after a record is modified. Some embodiments apply the criteria (condition) described for a class group to a set of records whenever the class group is accessed.

Some embodiments allow for auditing of records that may be in a group. The records may maintain an audit history for various criteria. Accordingly, the records maintain an audit log of when a record entered or left any particular group. This may enable applications to retrieve records that are part of a group for a given time period. For example, some applications may track which employees were full-time for a given time period (e.g., in the last year) to determine benefits. Some embodiments allow applications to determine the date that a record became a part of or left a group.

FIG. 1 is a system diagram for enabling user-defined criteria for grouping of records, according to some embodiments. FIG. 1 illustrates a system 100 that includes a business analyst tool 102, a business analyst 104, a business application 106, an end design user 105 and a number of business users 108A-108N. In operation, a business analyst 104 accesses the business analysist tool 102. In some embodiments, the interface of the business analyst tool 102 is a Graphical User Interface (GUI). In operation, the end design user 105 uses the business application 106 to input criteria for different subset groups. In some embodiments, the interface of the business application 106 is a Graphical User Interface (GUI). Example screen shots of the GUI are described in more detail below.

Using the business analyst tool 102, the business analyst 104 defines a business class group 110. The business class group 110 may comprises a criteria for membership among a subset of records. For example, the business class group 110 may be for employees working N number of hours, been employed for N number of years, etc. As further described below, after the business analysis 104 defines the business class group (110), a new field type is created in the business application 106. Using the business analyst tool 102, the business analyst 104 also defines use for a business class group (112). For example, an action may be defined to update benefits for employees that are full time.

Using the business application 106, the end design user 105 may define a criteria that is to be included in the business class group 110. In some embodiments, the end design user 105 may be a person in an organization that modifies the use of the business application 106 for applications that are specific to the organization. For example, the end design user 105 may be a person in the human resources department of the organization.

The business application 106 (having the new criteria for membership among a subset of records) may be executed by different business users 108A-108N to access these different subset of records for various applications. For example, employees in human resources in an organization may need lists of certain types of employees in the organization to provide benefits according to the employees being within certain groups (as defined by various criteria). As further described below, the determination of membership in a subset of records is determined at run-time of the business application 106.

Figure 2:
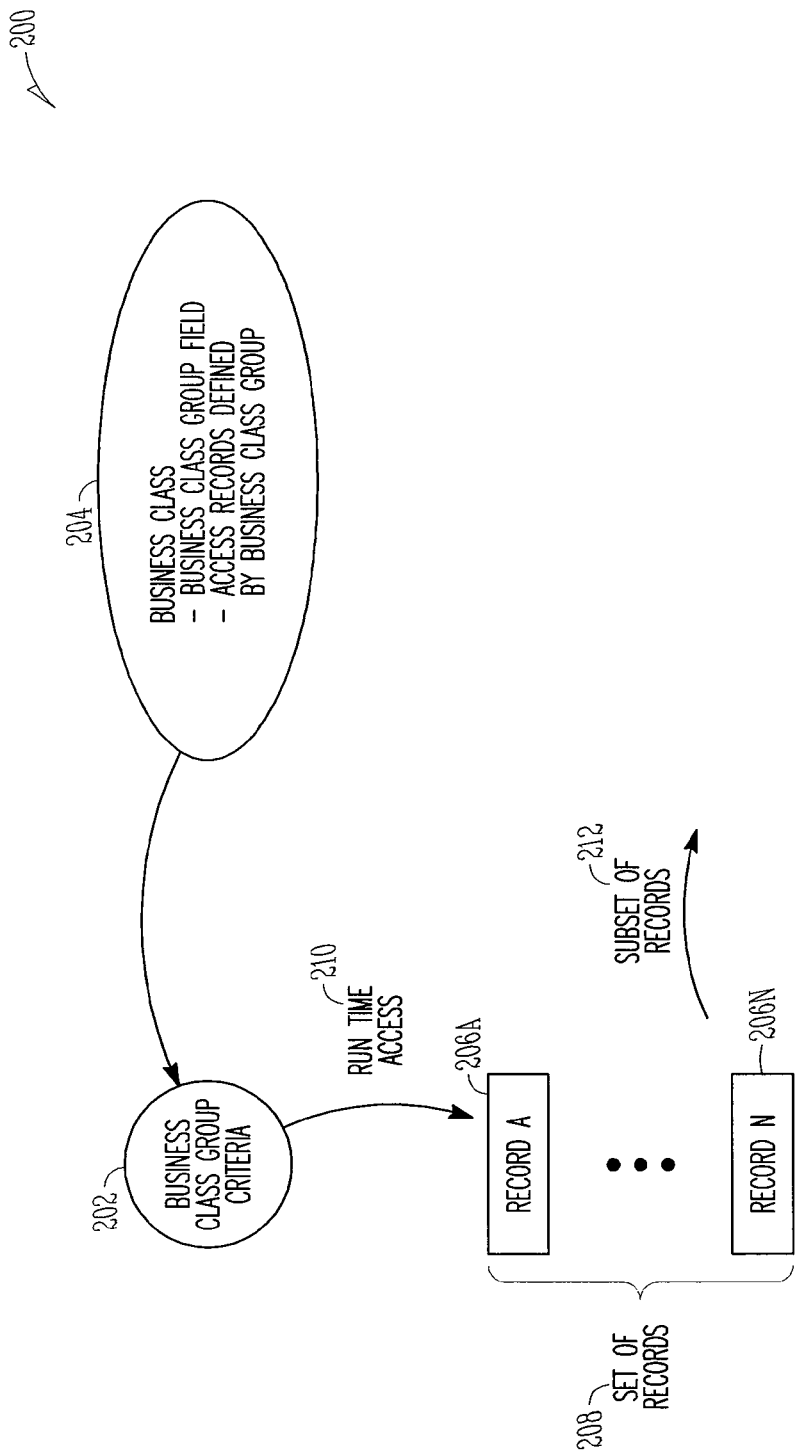
FIG. 2 is a diagram of the relationships among the business class group, the use of the business class group and a set of records processed in accordance with the business class group, according to some embodiments.

FIG. 2 is a diagram of the relationships among the business class group, the use of the business class group and a set of records processed in accordance with the business class group, according to some embodiments. A diagram 200 includes a business class group 202, a business class 204 and a set of records 208. The set of records includes a number of records 206A-206N.

The business class group 202 is a field type that may be referenced in various logic within a business application. As shown in this example, the logic for referencing the business class group 202 is within the business class 204. The business class 204 includes a business class group field definition. The business class 204 also comprises a method that accesses a subset of records as defined by the criteria in the business class group 202. The business class group 202 includes a criteria (condition) that may be defined by an end design user (as described above). Accordingly, when executed, the method in the business class 204 references the business class group 202 to access at run time (210) a subset of records (212) that are within the set of records 208. In particular, the records 206 are processed at run-time to determine which records satisfy the criteria as defined in the business class group 202.

Executable code may be derived, at least partially, from the business class group 202 and the business class 204. The business class group 202, the business class 204, the set of records 208 and the executable code may reside on various types of machine-readable media. An example system that comprises such machine-readable media is described in more detail below. Such executable code may be executed to perform operations as described herein. Machine-readable media includes any mechanism that provides (that is, stores and/or transmits) information in a form readable by a machine (for example, a computer). For example, a machine-readable medium includes read only memory (ROM), random access memory (RAM), magnetic disk storage media, optical storage media, flash memory devices, etc. While described as executable code, in some embodiments, the operations herein may be performed by other types of logic (for example, digital logic).

Figure 3:
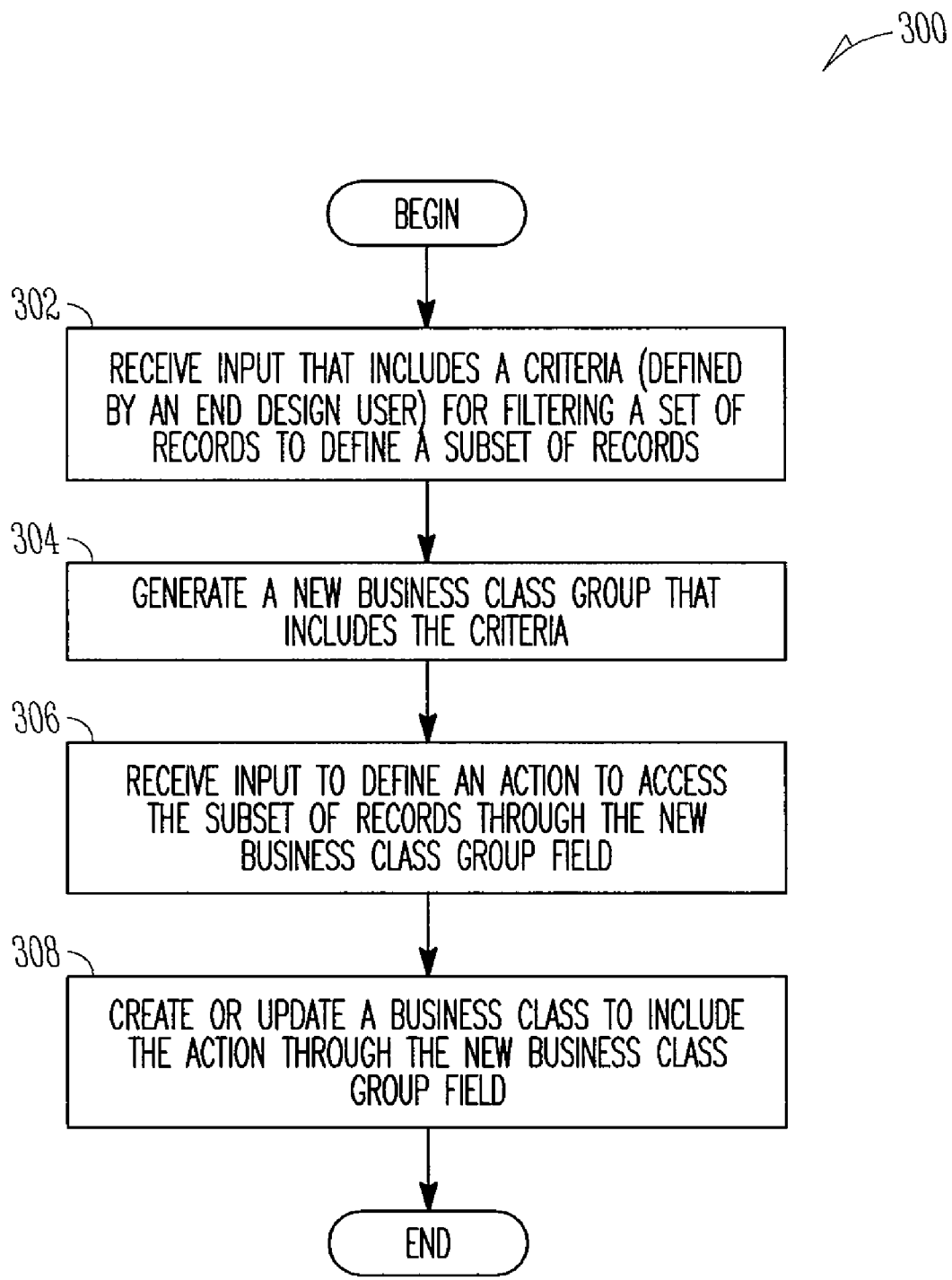
FIG. 3 illustrates a flow diagram of operations for processing of user-defined criteria for grouping of records, according to some embodiments.

This section provides a description of operations for processing of user-defined criteria for grouping of records, according to some embodiments. In certain embodiments, the operations are performed by instructions residing on machine-readable media (e.g., software), while in other embodiments, the methods are performed by hardware or other logic (e.g., digital logic). FIG. 3 illustrates a flow diagram of operations for processing of user-defined criteria for grouping of records, according to some embodiments. FIG. 3 illustrates operations that may be executed by the business application 106 of the system 100. The flow diagram 300 commences at block 302.

Figure 4:
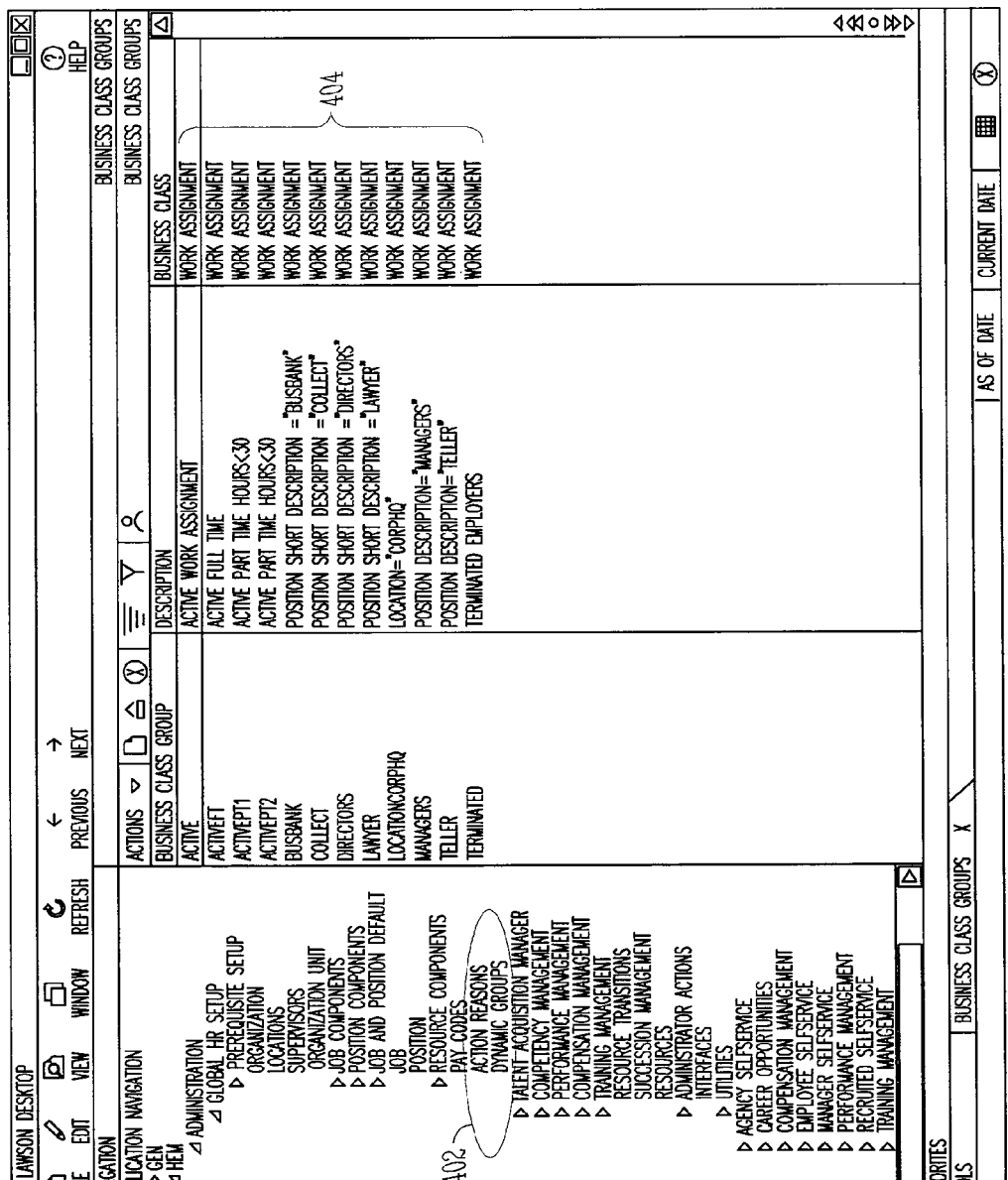
FIG. 4 illustrates a screen shot of a Graphical User Interface (GUI) to receive a new business class group definition into a business analyst tool, according to some embodiments.

At block 302, the business application 106 receives input (as defined by the end design user 105) for filtering a set of records to define a subset of records. In some embodiments, using the business analyst tool 102, the business analyst 104 defines a business class group and a use for the business class group. The end design user 105 may then input the criteria to define a subset of records. Specifically, the inputted criteria is associated with the business class group and its use (as defined by the business analyst 104. To illustrate, FIGS. 4, 5A-5B and 6 illustrate screen shots of a Graphical User Interface (GUI) that are used to receive input for creating a business class group, according to some embodiments. FIG. 4 illustrates a screen shot of a Graphical User Interface (GUI) to receive a new business class group definition into the application system, according to some embodiments. A screen shot 400 includes a menu 401 that includes the option for dynamic groups 402. After the business analyst 104 selects the dynamic groups 402, the screen shot 400 is populated with a list 404 of existing business class groups (as shown). An entry for a business class group comprises a name, a description, a business class and group membership criteria (not shown in list but illustrated in FIGS. 5-6 described below). The business analyst 104 may select an option to create a new business class group that will subsequently be added to the list 404.

Figure 5A:
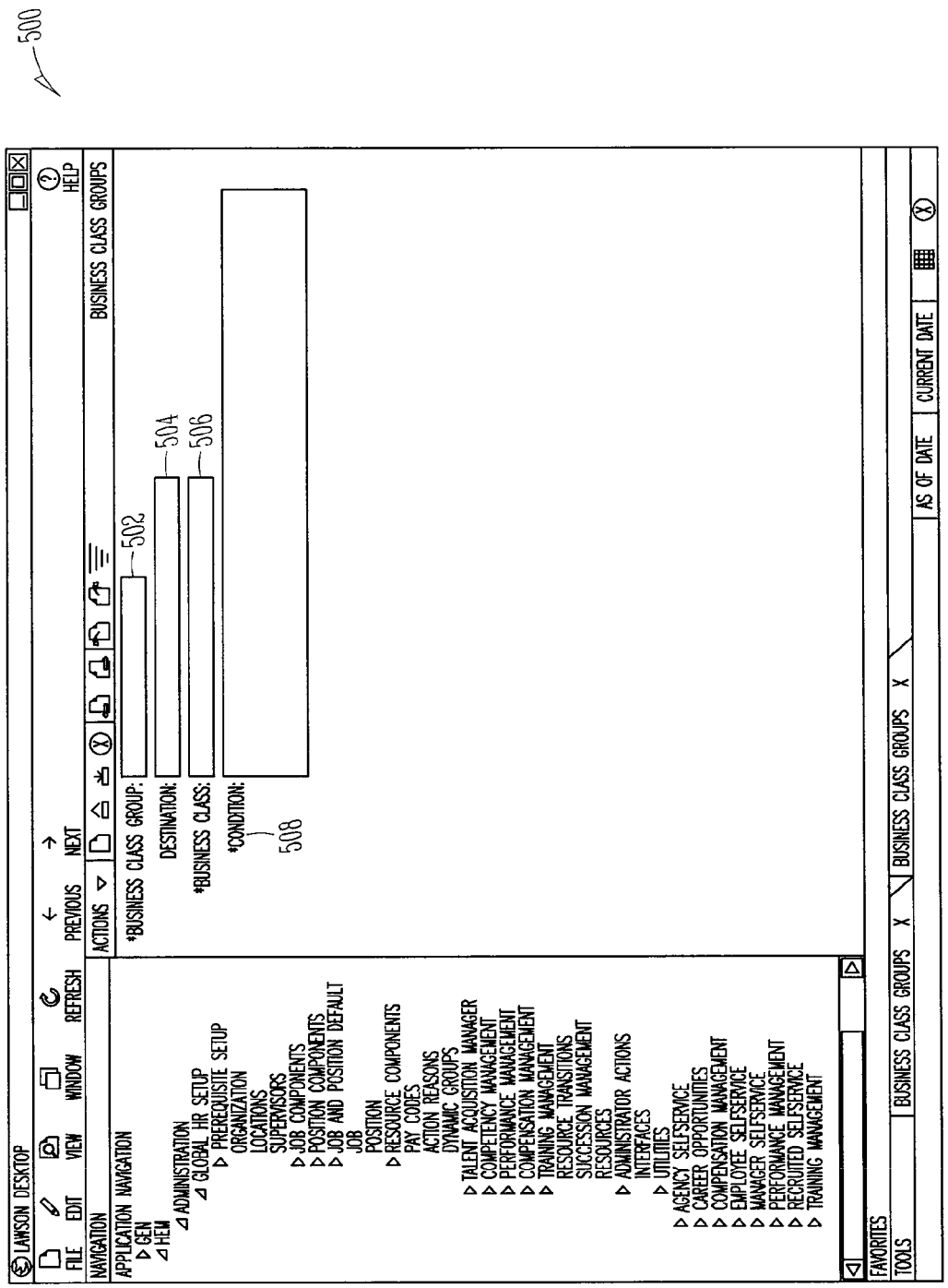
FIGS. 5A-5B illustrate a screen shot of a GUI to input a new business class group definition into a business analyst tool, according to some embodiments.
Figure 5B:
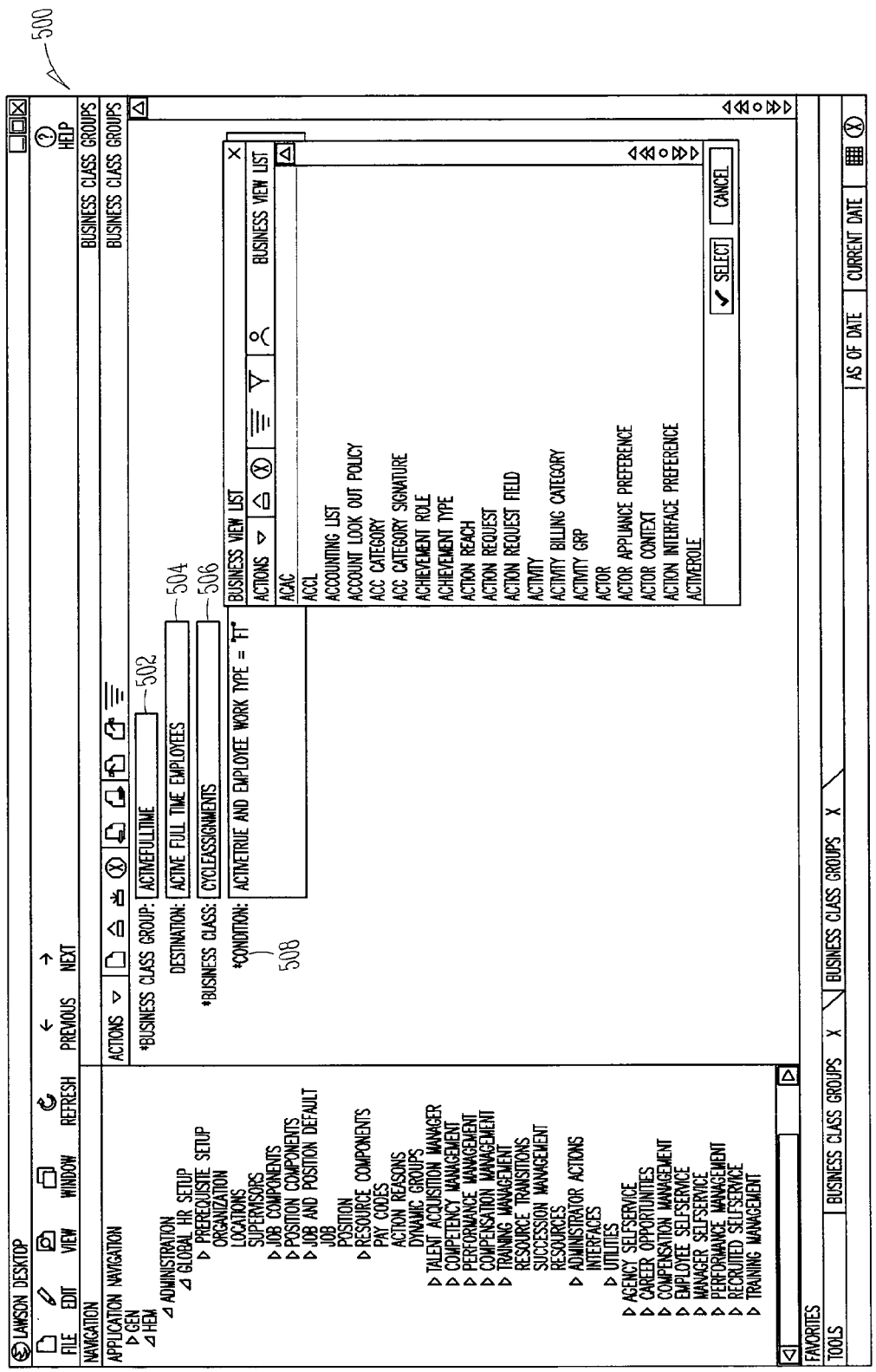

FIGS. 5A-5B illustrate a screen shot of a GUI to input a new business class group definition into a business analyst tool, according to some embodiments. A screen shot 500 includes a data input field 502 for inputting a name of the business class group. The screen shot 500 includes a data input field 504 for inputting a description of the business class group (e.g., "Full Time Employees). The screen shot 500 also includes a data input field 506 for inputting the name of the business class. The business class is the business class for which records are returned, if the condition is met. The screen shot 500 includes a data input field 508 for input the condition. The condition may be based on a given set of syntax rules. The condition defines the condition that is to be satisfied by a given record so that the record is considered to be a member of a subset of records. An example of a condition may include number hours worked in a week, a year, etc. for a given employee. The business analyst 104 may input data into the data input fields 502, 504 and 506. The end design user 105 may input data into the data input fields 508.

Figure 6:
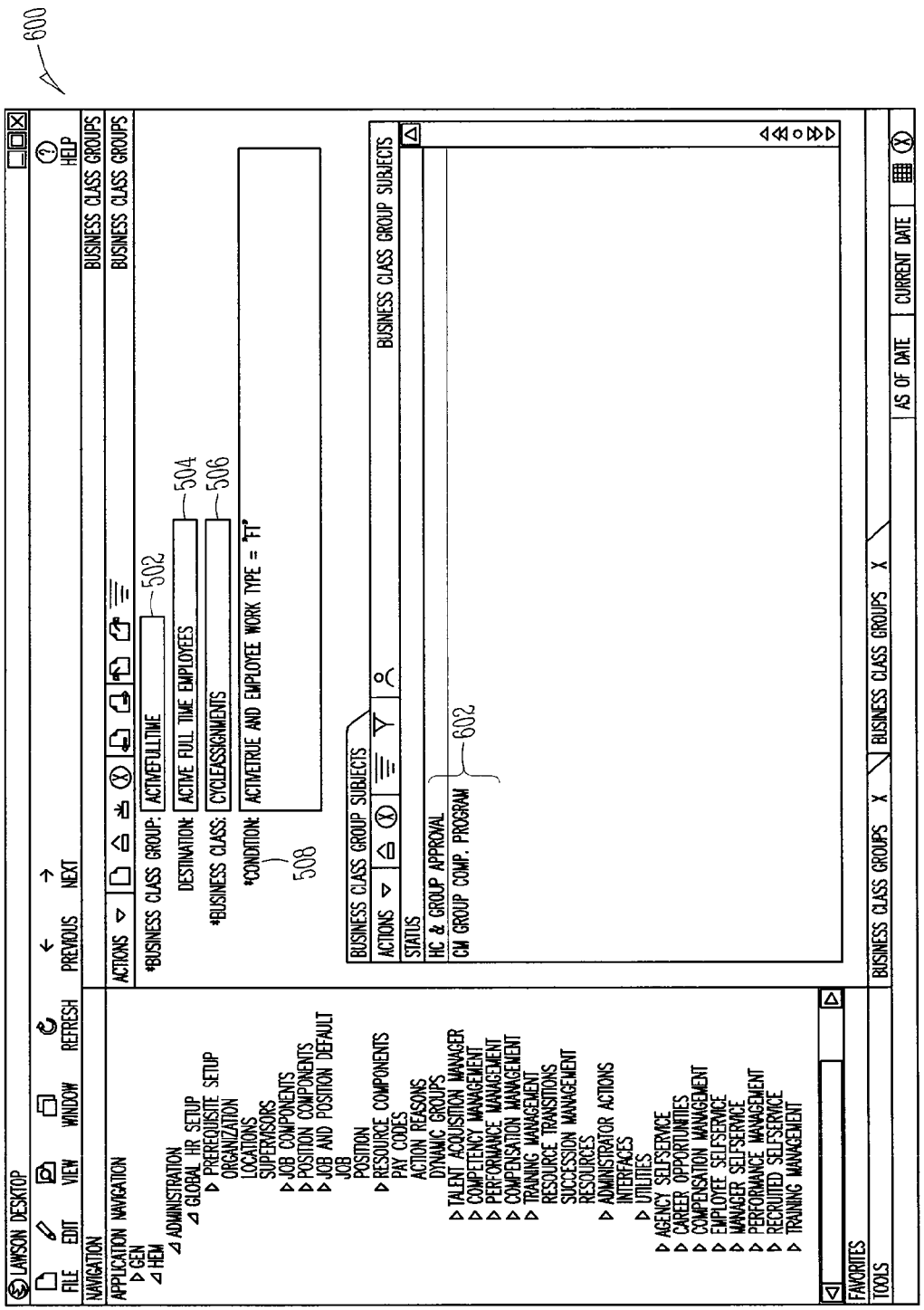
FIG. 6 illustrates a screen shot of a GUI to input which logic in an application may use the business class group, according to some embodiments.

FIG. 6 illustrates a screen shot of a GUI to input which logic in an application may use the business class group, according to some embodiments. A screen shot 600 includes the data input fields 502, 504, 506 and 508 (completed). The screen shot 600 also include a list 602 of those parts of the application that can access the business class group (as defined by the data in the data input fields 502, 504, 506 and 508). Returning to the flow diagram 300, the operations continue at block 304.

At block 304, the business application 106 updates the business class group with the criteria that is received from the end design user 105. The business class group having the criteria may be incorporated into the business application 106 for subsequent use by the business users 108.

Figure 7:
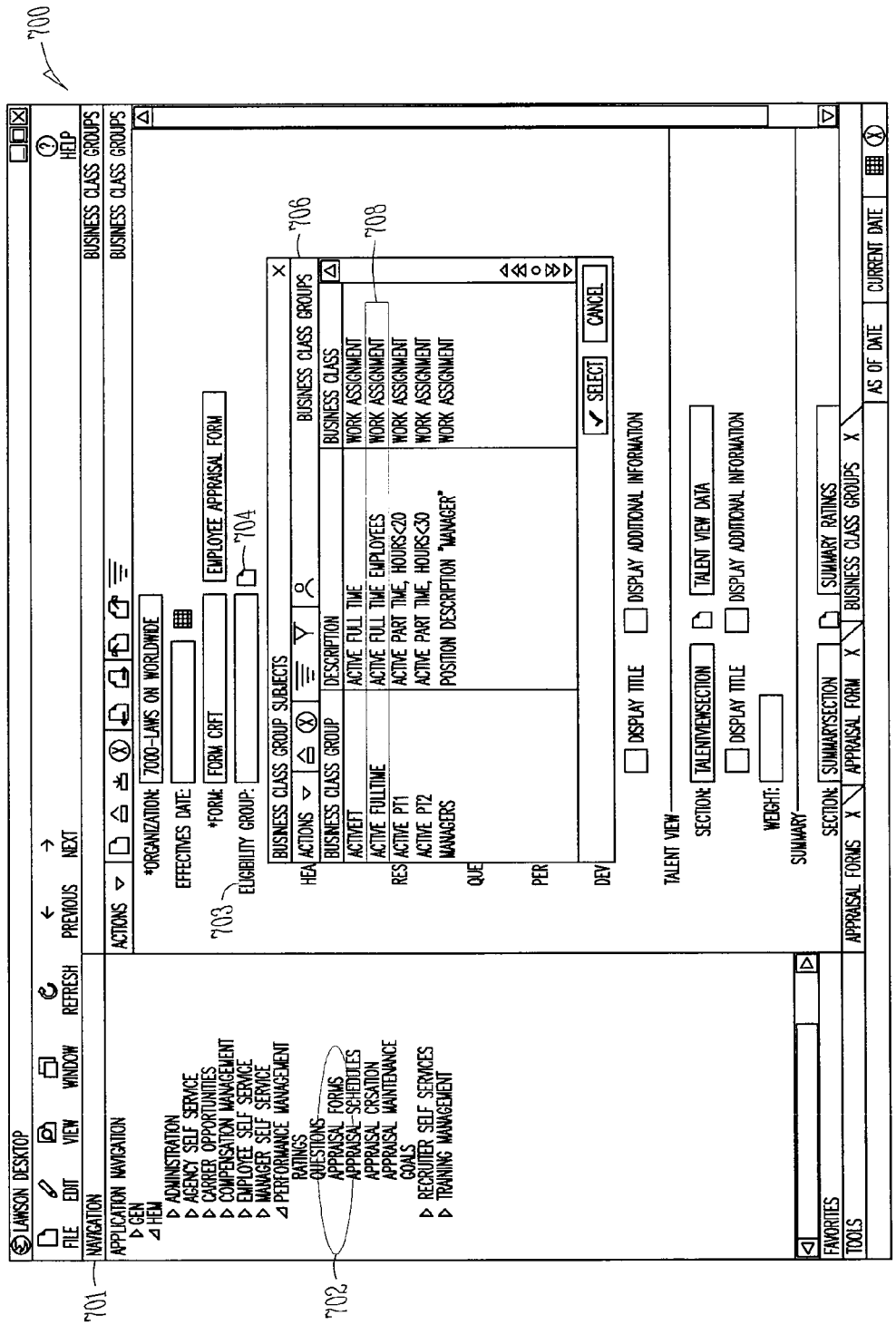
FIG. 7 illustrates a screen shot of a GUI to input a use of a subset of records defined by a business class group, according to some embodiments.

In some embodiments, the business analyst tool 102 receives input, from the business analyst 104 to define an action to access the subset of records through the business class group field. The action may be any type of logic and located in different areas of an application. The action may be part of a method defined in a class to access to the subset of records. For example, the method may access the subset of employee records for employees of a certain category (e.g., employees that are full time) in a human resources application to apply benefits, perform performance appraisals, determine raises, etc. The business analyst 104 may input the action that is to be received by the business analyst tool 102. For example, FIG. 7 illustrates a screen shot of a GUI to input a use of a subset of records defined by a business class group, according to some embodiments. In this example, the use of the subset of records is for performance appraisals for a certain group of employees. A screen shot 700 includes a menu 701 that includes the option for appraisal forms 702 from the performance management menu. After the business analyst 104 selects the appraisal forms 702, the screen shot 700 is populated with input fields to define a new performance appraisal. One input field includes an eligibility group 703.

The business analyst 104 may select an icon 704 to cause a dialog box 706 is displayed for a selection of one of business class groups to be the eligibility group 703. In this example, the business analyst 104 selects the business class group "active full time" 708. Returning to the flow diagram 300, the operations continue at block 308.

Figure 8:
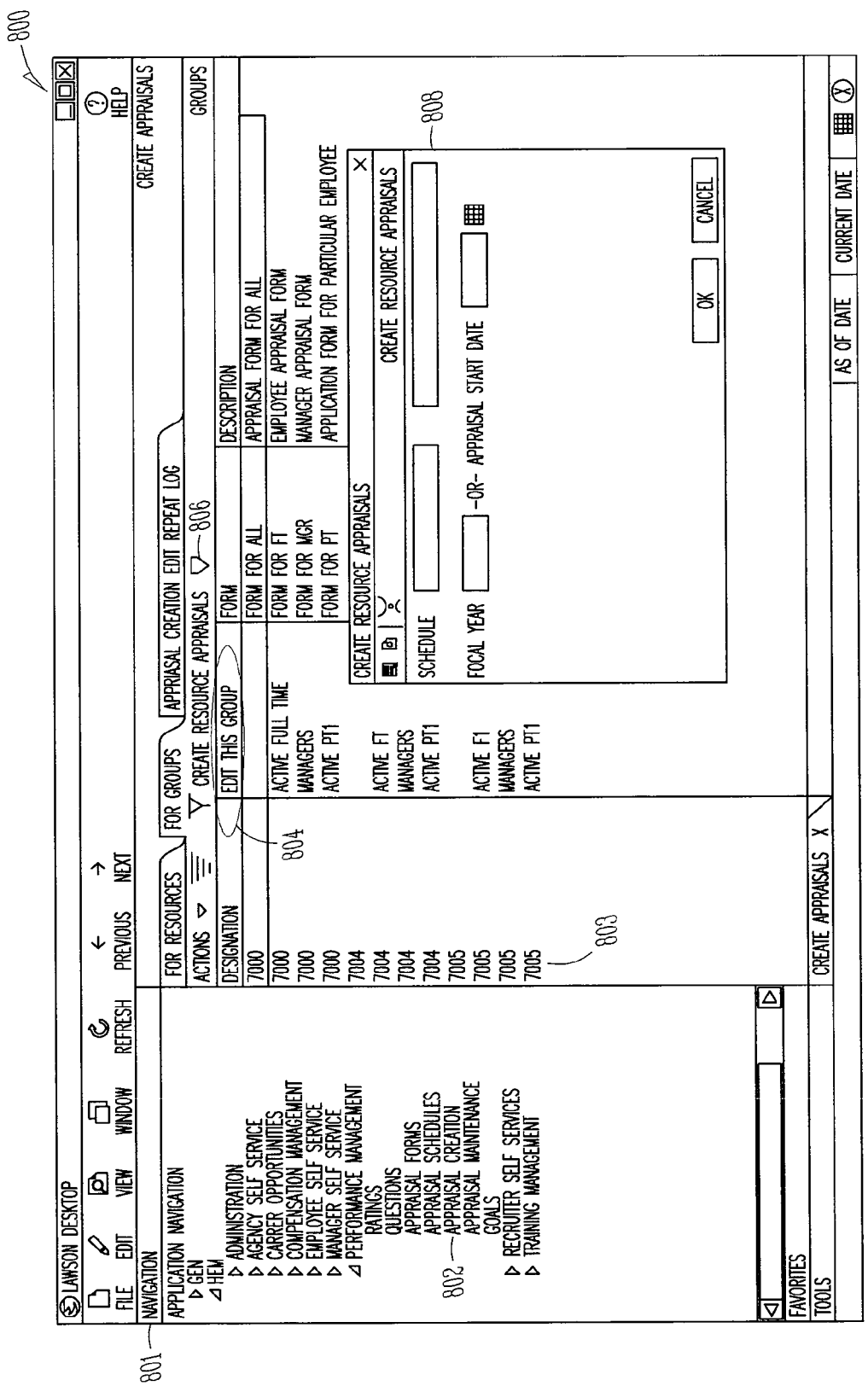
FIG. 8 illustrates a screen shot of a GUI to input an action that references a business class group, according to some embodiments.

FIG. 8 illustrates a screen shot of a GUI to input an action that references a business class group, according to some embodiments. A screen shot 800 includes a menu 801 that includes an option 802 "Appraisal Creation". After the business analyst 104 selects the option 802, a list of appraisal templates 803 is display along with the associated eligibility group 804 for each template. After the business analyst 104 selects an action 806 "Create Resource Appraisals", a dialog box 808 is displayed. In the dialog box 808, the business analysis 104 may fill in desired appraisal schedule and year. The business analyst tool 102 may create the appraisal form for each person that meets the form's eligibility group criteria. Accordingly, the business class group is used to determine this eligibility group based on the associated criteria.

The operations of the flow diagram 300 are complete.

Figure 9:
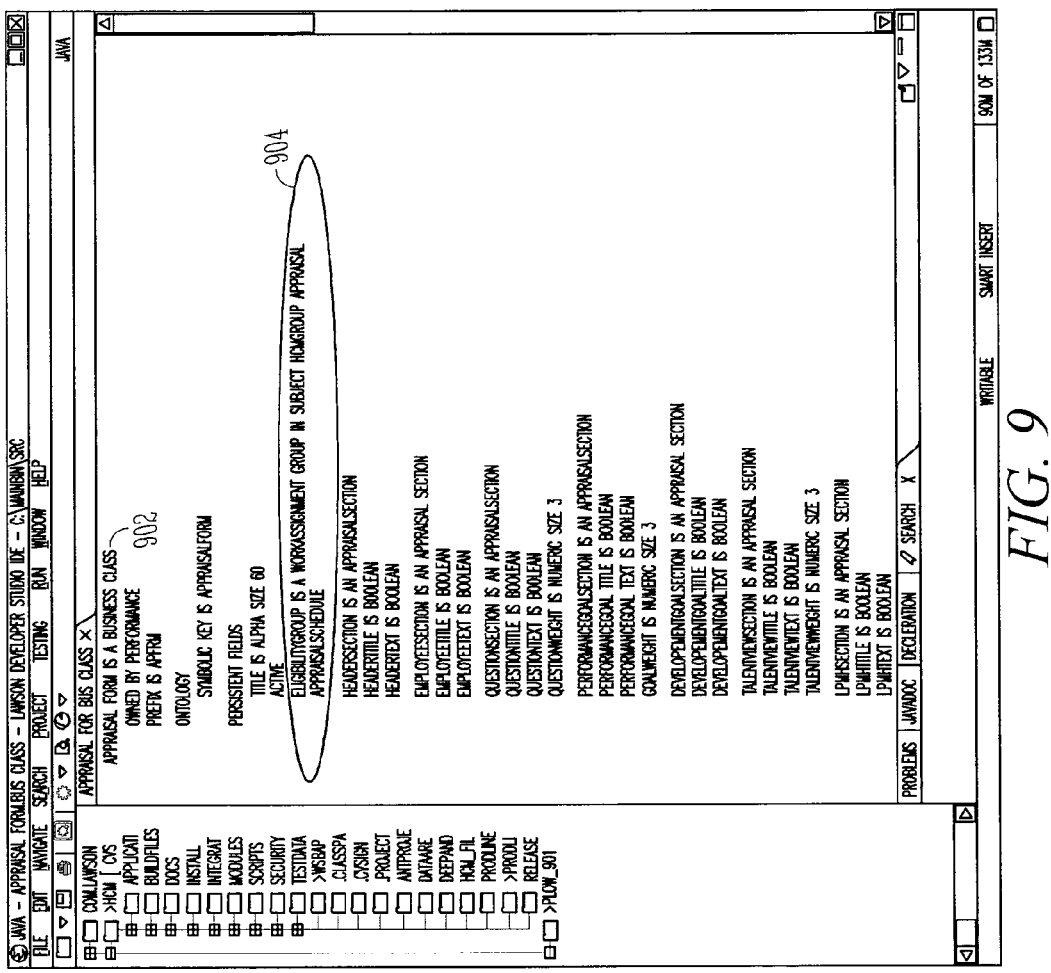
FIG. 9 illustrates a screen shot of a GUI that includes an example business class that uses a business class group to access a subset of records, according to some embodiments.

Examples business classes and logic that access a subset of records that satisfy a criteria defined within a business class group are now described. In particular, FIGS. 9-12 illustrate screen shots of a GUI that includes business classes and logic that access a subset of records that satisfy a criteria defined within a business class group, according to some embodiments. FIG. 9 illustrates a screen shot of a GUI that includes an example business class that uses a business class group to access a subset of records, according to some embodiments. A screen shot 900 includes the definition of a business class for an appraisal form 902. Within the business class 902, the field "EligibilityGroup" is defined (904). At 904, the language "is a WorkAssignment group" indicates the business class of the group definition. Also, the language "is subject HCMGroupAppraisal" indicates the relevant group definition subject. Accordingly, when a user is viewing a form on which this field exists and when the user selects a value for this field, the user will be selecting a record from the 'BusinessClassGroup' business class that has been defined for the business class 'WorkAssignment' (e.g. and not for the business class 'Vendor') and that has been associated to the subject 'HCMGroupAppraisal' (e.g. and not for the subject 'BenefitsPlanEligibility').

Figure 10:
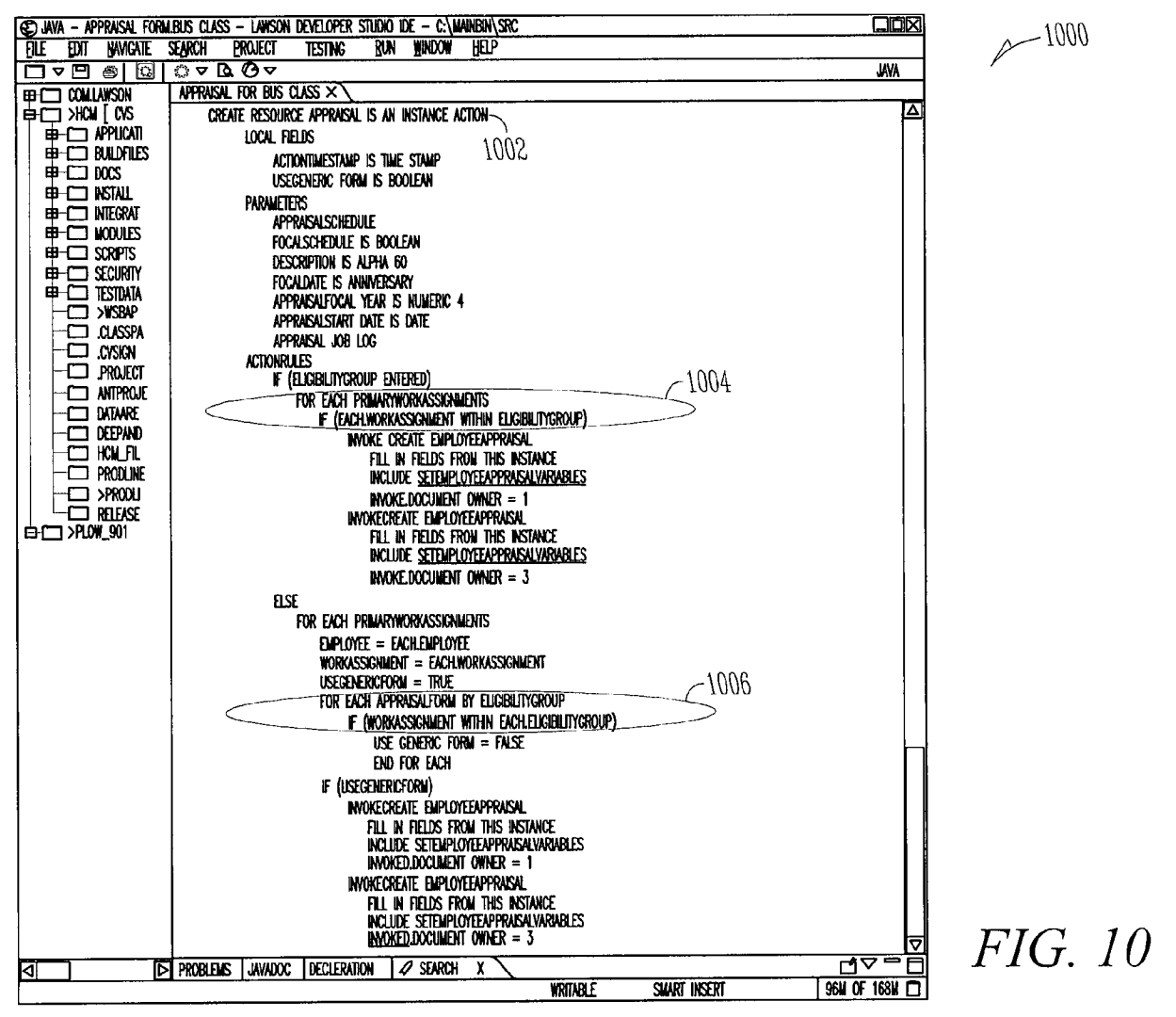

FIG. 10 illustrates a screen shot of a GUI that includes example logic for performing an action that references membership within a subset of records as defined by a business class group, according to some embodiments. A screen shot 1000 includes logic to perform an action 1002 ("CreateResourceAppraisals"). At 1004 and 1006, the logic determines whether the work assignment for an employee is "within EligibilityGroup." In this example, if the work assignment meets the Eligibility Group criteria, an Employee Performance Appraisal form is created.

Figure 11:
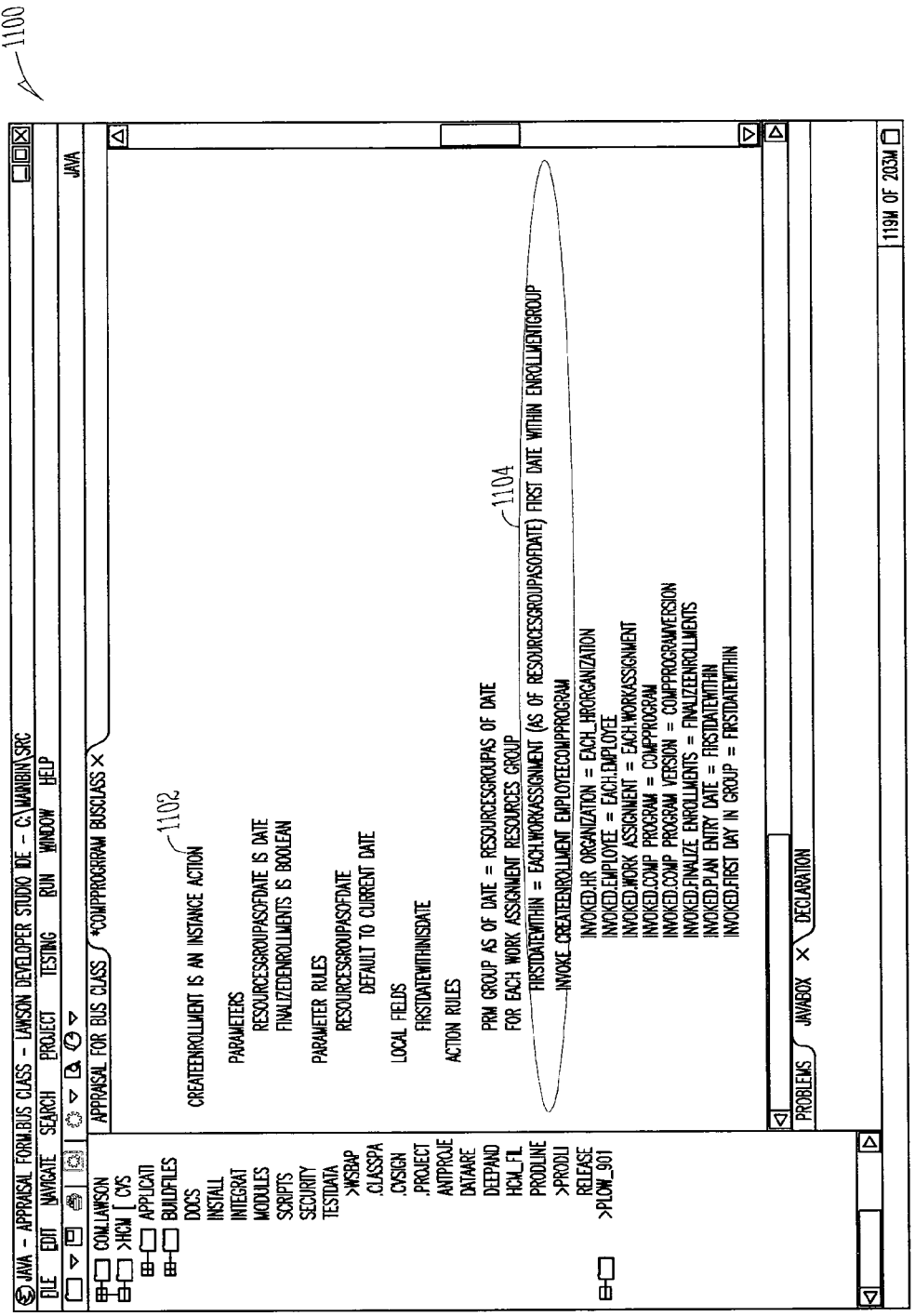
FIG. 11 illustrates a screen shot of a GUI that includes example logic for performing an action that determines a first date that a record was within a subset of records defined by a business class group, according to some embodiments.

Some embodiments comprise auditing of the set of records to determine membership in a subset of records that satisfy a given criteria within a given time period. Similar to embodiments described above, this subset of records is determined using a criteria that is defined within a business class group. For example, FIG. 11 illustrates a screen shot of a GUI that includes example logic for performing an action that determines a first date that a record was within a subset of records defined by a business class group, according to some embodiments. A screen shot 1100 includes logic to perform an action 1102 ("CreateEnrollment") to create an Employee Compensation Program record. At 1104, the logic determines the first date that a person meets the Enrollment Group condition ("first date within"). If an employees does meet the group condition, a Compensation Program record is created for the person using a plan entry date of 'first date within' the group.

Figure 12:
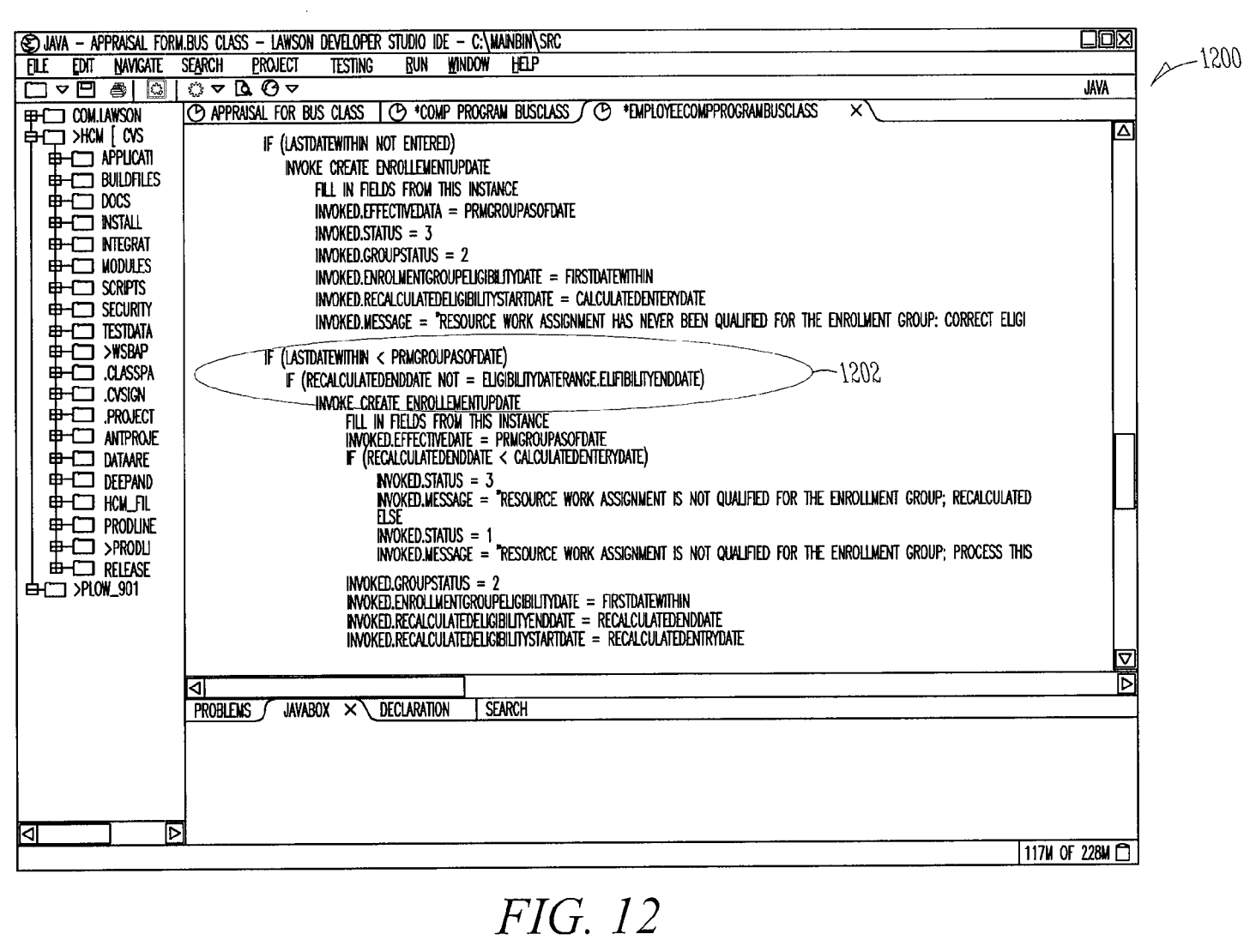

FIG. 12 illustrates a screen shot of a GUI that includes example logic for performing an action that determines a last date that a record was within a subset of records defined by a business class group, according to some embodiments. A screen shot 1200 includes logic to perform an action to 'RecalculateEnrollment' in Employee Compensation Program records (e.g. determining whether persons in the program are still eligible to be in the program). The logic 1202 determines the last date that the person met the group condition ("last date within"). If the last date the record for this person met the group condition was earlier than a parameter 'group as of date' (the value would have been entered by the person performing the action), then the person's Compensation Program record would be updated to indicate 'no longer eligible'.

Figure 13:
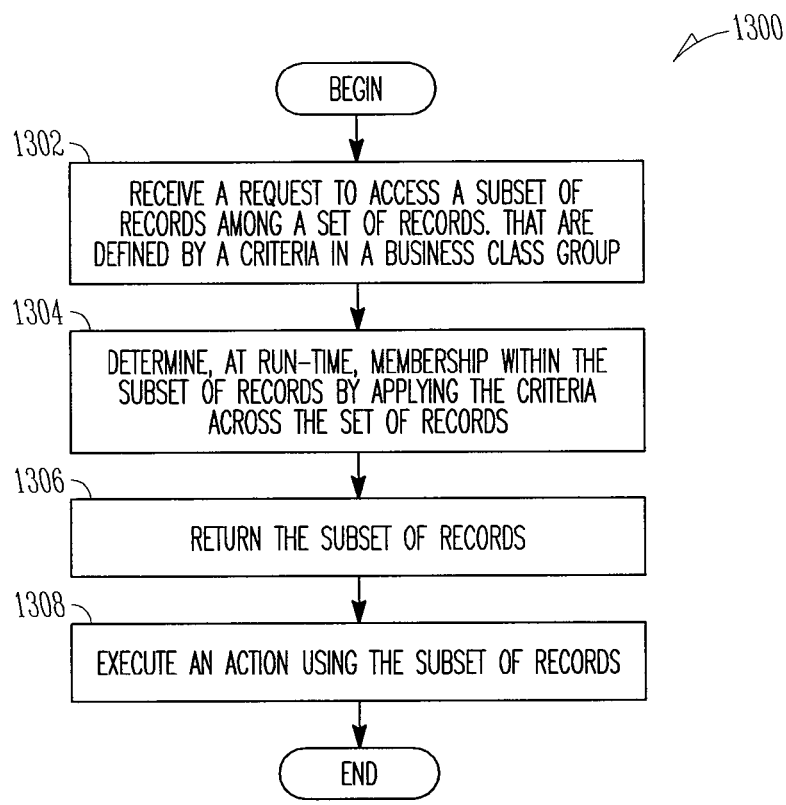
FIG. 13 illustrates a flow diagram of operations for determining, at run-time, membership in a subset of records among a set of records using a business class group, according to some embodiments.

The operations for determining, at run-time, membership in a subset of records among a set of records using a business class group are now described. In particular, FIG. 13 illustrates a flow diagram of operations for determining, at run-time, membership in a subset of records among a set of records using a business class group, according to some embodiments. FIG. 13 illustrates operations that may be executed by the business application 106 of the system 100. With reference to FIG. 2, in example embodiments, a business user 108 may cause execution of the business application 106 in order to perform various tasks within an organization. For example, persons in Human Resources may execute the business application 106 to retrieve various categories of records (e.g., certain types of employees) for compensation and benefits determination/adjustment, etc. In another application, persons in an organization may execute the business application 106 to retrieve various categories of records related to clients, vendors, etc. The operations of the flow diagram 1300 are also described in reference to the diagram 200 of FIG. 2. The flow diagram 1300 commences at block 1302.

At block 1302, the application 106 receives a request to access a subset of records among a set of records that are defined by a criteria in a business class group. As described above, the end-design user may create logic (that includes such a request) that becomes part of the application 106. With reference to FIG. 1, one of the business users 108 may cause execution of the logic within the application 106. For example, the business user 108 may be a person in Human Resources in an organization. Such person may cause a computer to execute the application 106. For example, this person may want to execute logic to obtain a list of all full time employees. The list may include be a subset of records of such employees. The logic may use this list for a number of operations (e.g., calculate pension distribution, health plan contributions, etc.). With reference to FIG. 2, the logic may be the function in the business class 204 that is to access records defined by the business class group. The flow continues at block 1304.

At block 1304, the application 106 determines, at run-time, membership within the subset of records by applying the criteria across the set of records. With reference to FIG. 2, the application 106 performs access, at run-time (210), of the set of records 208 to determine which records 206 are members of the subset of records 212 based on the criteria set forth in the business class group 202. The flow continues at block 1306.

At block 1306, the application 106 returns the subset of records. With reference to FIG. 2, the subset of records 212 are returned to the logic in the business class 204 that made the request. The flow continues at block 1308.

At block 1308, the application 106 executes an action using the subset of records. As described above, various logic within the application 106 may use the subset of records. For example, the logic may update the subset of records, update other records, distribute or print parts of the data in the subset of records, etc. The operations of the flow diagram 1300 are complete.

Figure 14:
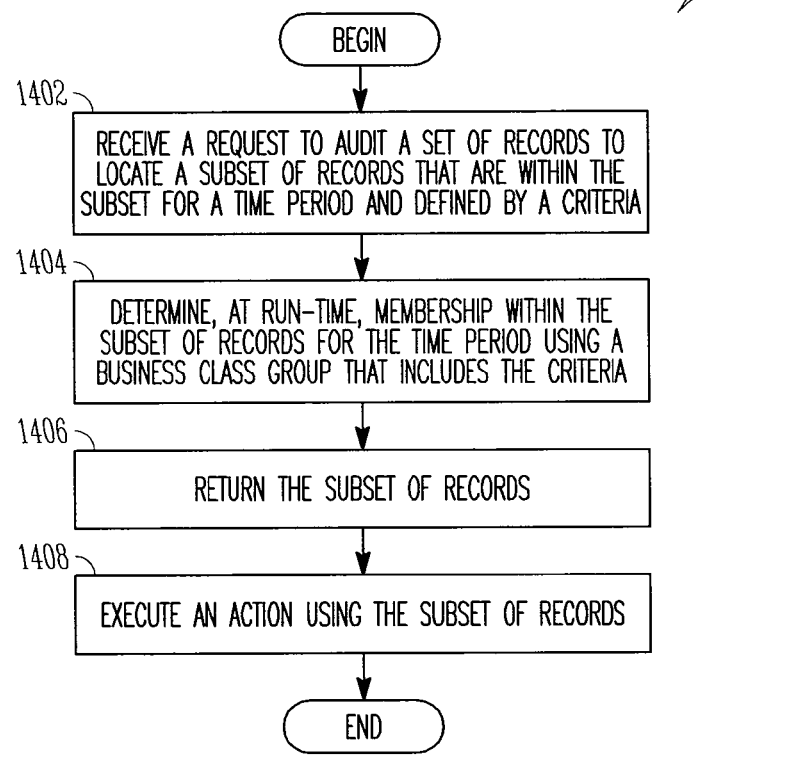
FIG. 14 illustrates a flow diagram of operations for determining, at run-time, membership (at a given time) in a subset of records among a set of records using a business class group, according to some embodiments.

The operations for determining, at run-time, membership (at a given time period) in a subset of records among a set of records using a business class group are now described. In particular, FIG. 14 illustrates a flow diagram of operations for determining, at run-time, membership (at a given time) in a subset of records among a set of records using a business class group, according to some embodiments. Similar to FIG. 13, FIG. 14 illustrates operations that may be executed by the business application 106 of the system 100. With reference to FIG. 2, in example embodiments, a business user 108 may cause execution of the business application 106 in order to perform various tasks within an organization. For example, a sales person may need a list of vendors for the organization for a previous year, last month, etc. The operations of the flow diagram 1400 are also described in reference to the diagram 200 of FIG. 2. The flow diagram 1400 commences at block 1402.

At block 1402, the application 106 receives a request to audit a set of records to locate a subset of records that are within the subset for a given time period and defined by a criteria. As described above, the end-design user may create logic (that includes such a request) that becomes part of the application 106. With reference to FIG. 1, one of the business users 108 may cause execution of the logic within the application 106. For example, the business user 108 may be a person in Human Resources in an organization. Such person may cause a computer to execute the application 106. For example, this person may want to execute logic to obtain a list of all full time employees over the past year. The list may include be a subset of records of such employees. The logic may use this list for a number of operations (e.g., calculate pension distribution, health plan contributions, etc.). With reference to FIG. 2, the logic may be the function in the business class 204 that is to access records defined by the business class group. The flow continues at block 1404.

At block 1404, the application 106 determines, at run-time, membership within the subset of records for a given time period by applying the criteria across the set of records. With reference to FIG. 2, the application 106 performs access, at run-time (210), of the set of records 208 to determine which records 206 are members of the subset of records 212 based on the criteria set forth in the business class group 202. In some embodiments, the records 206 include an audit log for tracking changes to the record over time. Accordingly, the application may review the audit log to determine if the record was within a particular category for a given time period. In some embodiments, the logic illustrated in FIG. 11 is used to determine if a record is within a given time period. In particular, the logic determines the first date that a record satisfies the particular criteria. In some embodiments, the logic illustrated in FIG. 12 is used to determine if a record is within a given time period. In particular, the logic determines the last date that a record satisfies the particular criteria. The flow continues at block 1406.

At block 1406, the application 106 returns the subset of records. With reference to FIG. 2, the subset of records 212 are returned to the logic in the business class 204 that made the request. The flow continues at block 1408.

At block 1408, the application 106 executes an action using the subset of records. As described above, various logic within the application 106 may use the subset of records. For example, the logic may update the subset of records, update other records, distribute or print parts of the data in the subset of records, etc. The operations of the flow diagram 1400 are complete.

Figure 15:
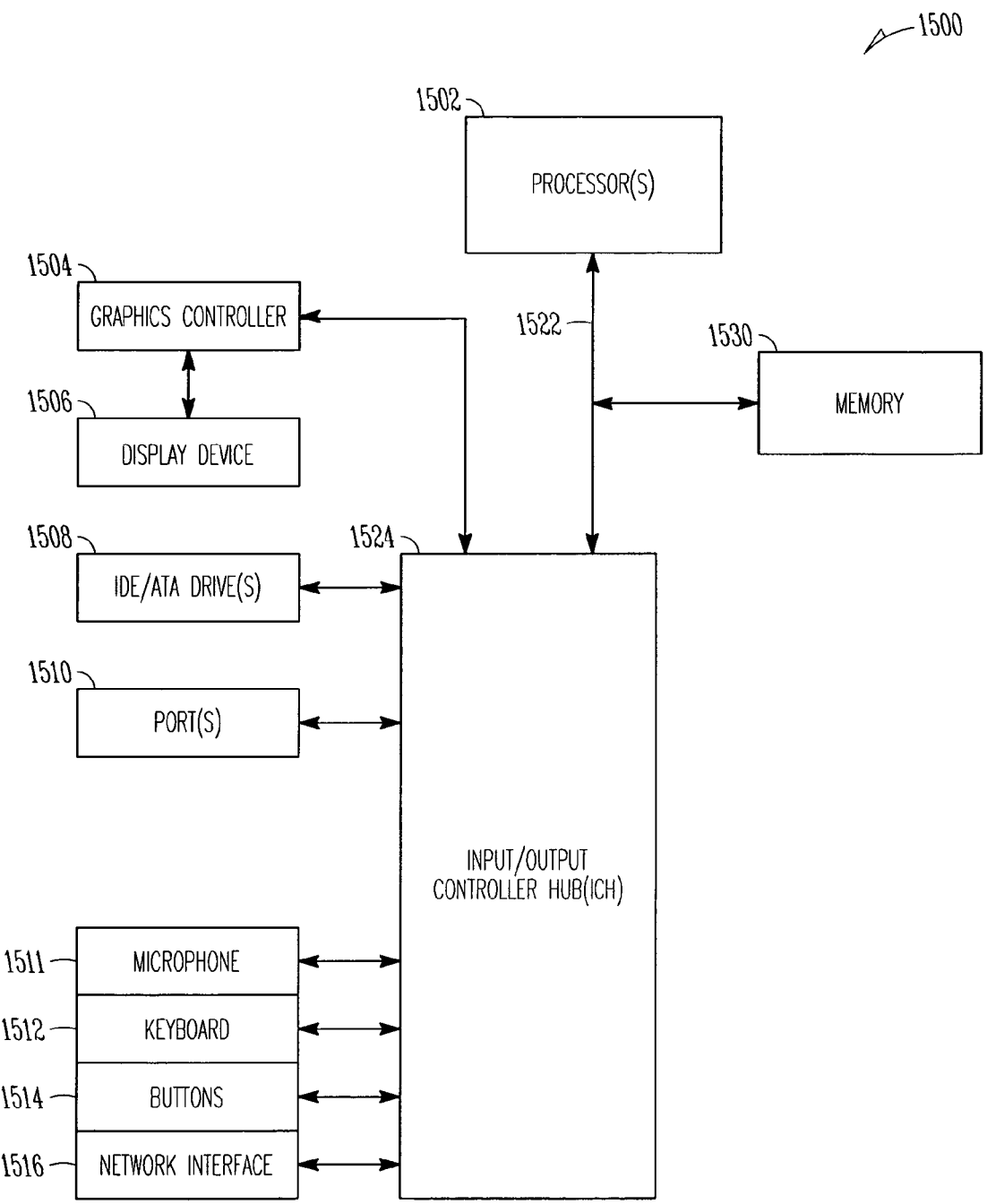
FIG. 15 illustrates an example computer system used in conjunction with some embodiments.

This section provides an overview of the example hardware and the operating environment in which embodiments can be practiced. FIG. 15 illustrates an example computer system used in conjunction with some embodiments. As illustrated in FIG. 15, computer system 1500 comprises processor(s) 1502. The computer system 1500 also includes a memory unit 1530, processor bus 1522, and Input/Output controller hub (ICH) 1524. The processor(s) 1502, memory unit 1530, and ICH 1524 are coupled to the processor bus 1522. The processor(s) 1502 may comprise any suitable processor architecture. The computer system 1500 may comprise one, two, three, or more processors, any of which may execute a set of instructions in accordance with at least some embodiments of the invention.

The computer system 1500 also includes a volatile memory 230, processor bus 222, and an Input/Output (I/O) controller hub (ICH) 224. The processor(s) 202, the volatile memory 230, and the ICH 224 are coupled to the processor bus 222. The processor(s) 202 may comprise any suitable processor architecture. The computer system 1500 may comprise one, two, three, or more processors, any of which may execute a set of instructions in accordance with embodiments of the invention. The processor(s) 202 may be different types of processors. For example, a first processor may be a general purpose processor, while a second processor may be a digital signal processor for decoding and encoding audio data, video data, etc.

The memory 230 may be representative of volatile and/or nonvolatile memory that stores data and/or instructions, and may comprise any suitable memory, such as a dynamic random access memory (DRAM), etc. The nonvolatile memory may be Static Random Access Memory (SRAM), flash memory, etc. The nonvolatile memory may also be Programmable ROM (PROM), Erasable PROM (EPROM), Electrically Erasable PROM (EEPROM), etc.

The computer system 1500 may include the parser 102, the database table generator 104, the object-oriented code generator 106, the compiler 108 and/or the execution unit 110. The parser 102, the database table generator 104, the object-oriented code generator 106, the compiler 108 and/or the execution unit 110 may be representative of hardware, firmware or a combination thereof. The parser 102, the database table generator 104, the object-oriented code generator 106, the compiler 108 and/or the execution unit 110 may be software instructions that reside in the memory 230 and/or one of the IDE/ATA drives 208, which may be executed by the processor(s) 202.

A graphics controller 204 controls the display of information on a display device 206, according to some embodiments of the invention. The ICH 224 provides an interface to I/O devices or peripheral components for the computer system 1500. The ICH 224 may comprise any suitable interface controller to provide for any suitable communication link to the processor(s) 202, the volatile memory 230 and/or to any suitable device or component in communication with the ICH 224. In some embodiments, the ICH 224 provides suitable arbitration and buffering for each interface.

For some embodiments of the invention, the ICH 224 provides an interface to a secondary storage 208 (which may be any type of nonvolatile data storage), such as a hard disk drive (HDD) or compact disc read only memory (CD ROM) drive, or to suitable universal serial bus (USB) devices through one or more USB ports. The secondary storage 208 may be read only, read/write, etc.

For some embodiments, the ICH 224 also provides an interface different user input devices (a microphone 211, a keyboard 212, buttons 214, etc.). For some embodiments, the ICH 224 also provides a network interface 220 though which the computer system 1500 may communicate with other computers and/or devices. The ICH 224 may provide an interface to any number of ports 210. The ports 210 may be used to provide different input/output.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment," "an embodiment," "an example embodiment," and so on, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (that is, stores and/or transmits) information in a form accessible by a machine (for example, a computer, a network device, a personal digital assistant, manufacturing tool, any device with a set of one or more processors, and so on). In an exemplary embodiment, a machine-readable medium includes volatile and/or non-volatile media (for example, read-only memory (ROM), random access memory (RAM), magnetic disk storage media, optical storage media, flash memory devices, and so on), as well as electrical, optical, acoustical or other form of propagated signals (for example, carrier waves, infrared signals, digital signals, and so on)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for user-definable run-time grouping of data records, in accordance with example embodiments. A number of figures show flow diagrams illustrating operations for user-definable run-time grouping of data records, in accordance with example embodiments. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
    receiving input that includes criteria for filtering a set of records to define a subset of records within the set of records, the criteria defined by an end design user;
    updating, using one or more processors, a business class group with the criteria, wherein the business class group is referenced by a business class that includes an action for accessing the subset of records through the business class group; and
    instantiating a business application, wherein instantiating includes creating a business object based on the business class and wherein the business object references the updated business class group, the business application to be executed by at least one end user to access the subset of records through the business class group.

2. The method of claim 1, wherein the criteria defines a group of individuals within an organization.

3. The method of claim 2, wherein the group of individuals comprises employees in a business organization.

4. The method of claim 2, wherein of which records are within the subset of records is determined at run time of the application.

5. A method comprising:
    receiving a request to access a subset of records within a set of records, wherein the subset of records are defined by criteria in a business class group, and wherein the business class group is a field within a business class;
    receiving, at run time, the criteria from an end-user;
    determining, at run time using one or more processors, membership within the subset of records by applying the criteria across the set of records;
    instantiating a business object based on the business class;
    returning the subset of records to the business object; and
    executing an action defined within the business class using the subset of records.

6. The method of claim 5, wherein the subset of records comprise records for employees in an organization.

7. The method of claim 6, wherein the action is from a group consisting of employee performance appraisal, employee compensation adjustment and employee benefit adjustment.

8. The method of claim 5, wherein the subset of records comprise records for vendors for an organization.

9. The method of claim 5, wherein the criteria is defined by an end design user.

10. A method comprising:
    defining a business class group that includes criteria that select records within a set of records, wherein the criteria can be updated at run-time;
    receiving a request, at run-time, to audit records, the request including a specified time and defined criteria;
    determining, using one or more processors at run-time and as a function of the business class group and an audit log within each record of the set of records, a subset of records that met the defined criteria within the specified time;
    returning the subset of records; and
    executing an action using the subset of records.

11. The method of claim 10, wherein the specified time comprises a past time period.

12. The method of claim 10, wherein determining the subset of records comprises processing a record among the set of records, wherein the processing comprises returning a current date for the record if the record satisfies the defined criteria.

13. The method of claim 12, wherein the processing the record further comprises performing the following if the record does not satisfy the criteria:
    returning a date contained in the audit log of the record when the record previously satisfied the defined criteria, if the record previously satisfied the defined criteria.

14. The method of claim 10, wherein determining the subset of records comprises processing a record among the set of records, wherein the processing comprises returning a date contained in the audit log of the record when the record most recently satisfied the defined criteria.

15. A machine-readable medium including instructions which when executed by a machine causes the machine to perform operations comprising:
    receiving input that includes criteria for filtering a set of records to define a subset of records within the set of records, the criteria defined by an end design user;
    updating, using one or more processors, a business class group with the criteria, wherein the business class group is referenced by a business class that includes an action for accessing the subset of records through the business class group; and
    instantiating a business application, wherein instantiating includes creating a business object based on the business class and wherein the business object references the updated business class group, the business application to be executed by at least one end user to access the subset of records through the business class group.

16. The machine-readable medium of claim 15, wherein the criteria defines a group of individuals within an organization.

17. The machine-readable medium of claim 16, wherein the group of individuals comprises employees in a business organization.

18. The machine-readable medium of claim 15, wherein of which records are within the subset of records is determined at run time of the application.

19. A machine-readable medium including instructions which when executed by a machine causes the machine to perform operations comprising:
    receiving a request to access a subset of records within a set of records, wherein the subset of records are defined by criteria in a business class group, and wherein the business class group is a field within a business class;
    receiving, at run time, the criteria from an end-user;

determining, at run time using one or more processors, membership within the subset of records by applying the criteria across the set of records;

instantiating a business object based on the business class;

returning the subset of records to the business object; and executing an action defined within the business class using the subset of records.

20. The machine-readable medium of claim 19, wherein the subset of records comprise records for employees in an organization.

21. The machine-readable medium of claim 20, wherein the action is from a group consisting of employee performance appraisal, employee compensation adjustment and employee benefit adjustment.

22. The machine-readable medium of claim 19, wherein the subset of records comprise records for vendors for an organization.

23. The machine-readable medium of claim 19, wherein the criteria is defined by an end design user.

24. A method comprising:

defining a business class group that includes a first criterion that defines a subset of records within a set of records;

defining a business class that references the business class group, wherein the business class includes static business logic that uses the business class group in order to execute a function that operates on the subset of records;

executing an application, wherein the application includes a business object instantiated from the business class and the business class group;

receiving, during runtime of the application, a second criterion that replaces the first criterion within the business class group, wherein the second criterion re-defines the subset of records within the set of records; and executing the function, within the business object, that operates on the subset of records, wherein the subset of records is re-defined based on the second criterion.

\* \* \* \* \*